United States Patent [19]

Klicks et al.

[11] 3,996,071

[45] Dec. 7, 1976

[54] TEMPERATURE MEASURING DEVICE FOR USE AT PRESSURES IN EXCESS OF 1,500 BAR

[75] Inventors: Bernhard Klicks, Hagen, Haspe; Gunter Dornhoff, Hagen; Josef Stalzer, Hagen; Jorg-Peter Korner, Hagen, all of Germany

[73] Assignee: Friedrich Vade GmbH, Dortmund, Germany

[22] Filed: Mar. 15, 1976

[21] Appl. No.: 666,677

Related U.S. Application Data

[63] Continuation of Ser. No. 472,948, May 24, 1974, abandoned.

[30] Foreign Application Priority Data

June 12, 1973 Germany .......................... 2329836

[52] U.S. Cl. .................. 136/233; 136/230; 136/242; 73/341; 73/359 A
[51] Int. Cl.² ................... C04B 31/06; H01V 1/04
[58] Field of Search .......... 136/230, 232, 233, 242; 73/341, 359

[56] References Cited

UNITED STATES PATENTS 3,477,122   11/1969   Hamrick .......................... 136/230

3,539,400   11/1976   Pustell .............................. 136/233

FOREIGN PATENTS OR APPLICATIONS 505,891   9/1954   Canada .............................. 136/230
208,664   6/1907   Germany ........................... 136/233
814,503   6/1959   United Kingdom ............... 136/230

OTHER PUBLICATIONS

"Pyrometric Practice," 1921, Technological Paper, No. 170, National Bur. of Standards, by Foote et al.

Primary Examiner—Nelson Moskowitz
Attorney, Agent, or Firm—Malcolm W. Fraser

[57] ABSTRACT

A temperature measuring device for use at pressures in excess of 1,500 bar. It comprises a thermocouple which is sheathed, the sheath being surrounded from end to end by an open ended pressure bearing sleeve. The space between the sheath and sleeve receives a hard or high temperature solder. At the outer end of the sleeve is a rigid cone or outwardly flared surface associated with a screw threaded nut which, when tightened, forces the cone against a shoulder to effect a fluid-tight connection at a point remote from the measuring junction.

1 Claim, 2 Drawing Figures

TEMPERATURE MEASURING DEVICE FOR USE AT PRESSURES IN EXCESS OF 1,500 BAR

This is a continuation, of application Ser. No. 472,948 filed May 24, 1974, now abandoned.

BACKGROUND OF THE INVENTION

Temperature measuring devices with a thermocouple, called electric thermometers, are needed where local temperature measurements and instrument readings with the aid of expansion type thermometers are not possible and the measured variable must be transmitted electrically to a measuring and control station. If temperature measuring devices are intended to be installed into closed systems, for example piping and vessels, these devices must safeguard absolute tightness and yet exhibit high temperature sensitivity, that means extremely short response times.

For satisfying these requirements, it is known to use so-called sheathed thermocouples. These industrial thermocouples consist of two spaced conductors of dissimilar metals, a metal sheath surrounding the pair of conductors and closed at one end and containing a filler material which insulates the two metal conductors from each other. The two ends at one side of the metal conductors are joined by soldering to form the measuring junction. The measuring junction is located at the closed end of the metal sheath. It may contact the metal sheath or may be insulated from the sheath. In order to achieve a very short response time, i.e. a high temperature sensitivity, the metal sheath must be very thin, i.e. in the order of 0.03 to 0.3 mm. The two free ends of the metal conductors are carried through an insulating closure at the open end of the sheath and fixed in a coupling terminal for the connection of extension wires.

Where such thermocouples are intended for use on pressurized equipment, they will be provided with a screwed pressure joint. This pressure joint is of the multipiece type and comprises a ground finished high carbon steel ring that surrounds the sheath. The leakproof seat of the thermocouple is achieved through a slight deformation of the sheath.

Temperature measuring devices with screwed pressure joints as described above are suitable at most for use at pressures up to approximately 500 bar. At more elevated pressure levels, the screwed pressure joint is no longer leakproof and the sheath of the thermocouple is subject to deformation which makes the insulation ineffective. Trials have, therefore, been made by surrounding the sheath with a protective tube which is also closed at one end. This protective tube is welded to the screwed pressure joint. However, this design has proved to be too sluggish for a number of complex control procedures, i.e. the response time is too long. Measuring junction and process fluid are separated by the wall of the closed end protective tube.

SUMMARY OF THE INVENTION

The object of this invention is to eliminate the disadvantages of known temperature measuring devices for pressures exceeding 1,500 bar. The present invention relates to a temperature measuring device for use at pressures in excess of 1,500 bar., with sheathed thermocouple and a multipiece screwed pressure joint.

According to the invention, the problem is surprisingly solved in that a sealing cone of the screwed pressure joint is welded to a pressure bearing tube which is open at both ends and surrounds the sheathed thermocouple over its entire length from the sealing cone to the measuring junction, and that the annular space between the thermocouple sheath and the pressure bearing tube is filled with a hard metal solder.

The invention incorporates the particular advantage that the extremely short response times of thermocouples are maintained and that the temperature measuring device remains leakproof even at pressures that are far beyond 1,500 bar., for example 7,000 bar. The seal diameter of the temperature measuring device and of the screwed joint has been held at the most reduced size.

The temperature measuring device features high operational reliability because the strong tightening forces applied for screwing the temperature measuring device into the equipment to be pressurized are not transmitted to the thermocouple direct. The plastic hard metal solder acts as a damping agent. The annular space between the thermocouple sheath and the pressure bearing tube is filled with hard metal solder. This fill is long enough to absorb the shear force developed by the system pressure in an axial direction.

DESCRIPTION OF PREFERRED EMBODIMENT

Figure 1:
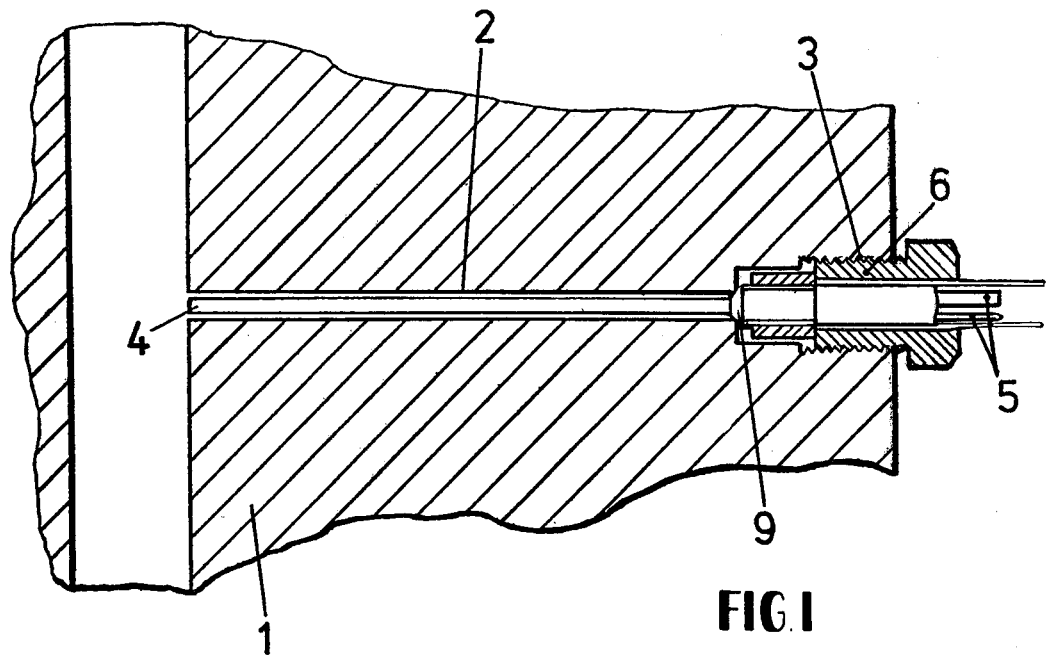
FIG. 1 is a fragmentary sectional view of a temperature measuring device installed in a high pressure equipment.

The high pressure equipment 1 is provided with a bore 2 whose diameter is at a minimum to reduce the forces exerted by a screwed joint 3. The temperature measuring device consists of a metallic sheathed thermocouple 4 with a coupling connector 5 for connecting the extension wires, a screw threaded flanged nut 6, and a metallic pressure bearing tube 7 rigidly secured or welded in place and being open at both ends. While the temperature measuring junction 8 is located inside the pressurized equipment at the point where temperature sensing is intended to be performed, a sealing cone, or outwardly flared surface, 9 for the temperature measuring device is welded to the pressure bearing tube 7 and is located remote from the junction to reduce the weakening of the equipment wall to a minimum.

Figure 2:
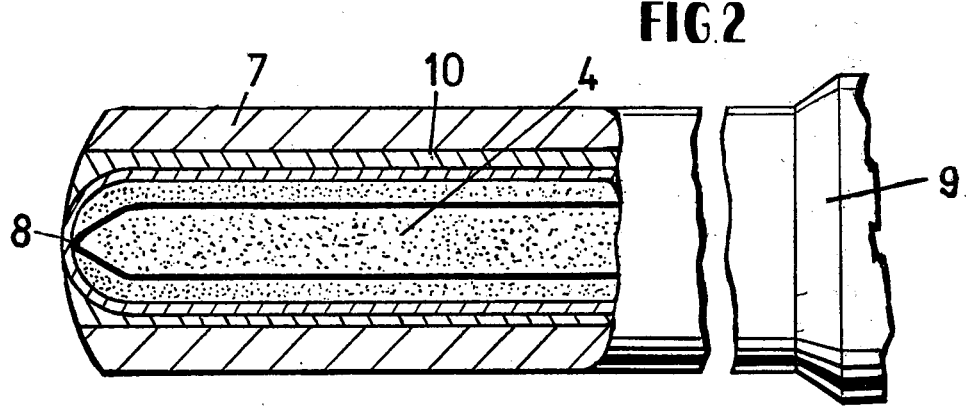
FIG. 2 is an enlarged fragmentary view of a thermocouple with sheath and pressure bearing tube.

FIG. 2 shows, on an enlarged scale, the temperature measuring device and, more particularly, the area of the pressure bearing tube 7. It is to be noted that hard metal solder 10 surrounds the thermocouple to dampen the forces developed by tightening the screwed pressure joint 3. By filling the entire annular space between the sheath of the thermocouple 4 and pressure bearing tube 7, by hard metal solder 10, the high pressure prevailing in the pressurized equipment can safely be retained. By hard metal solder is meant an alloy of nickel or copper or any metal that is classified as such by definition to have a specific weight above 5.

What we claim is:

1. A temperature measuring device for use at pressures in excess of 1,500 bar. and for mounting in a shouldered bore leading from the outside into a high pressure equipment, said device comprising
   1. a thermocouple adapted to be inserted in such bore,
   2. a metallic sheath enclosing said thermocouple, 3. a metallic open-ended pressure bearing sleeve surrounding the entire length of said sheath and substantially filling such shouldered bore,
4. said pressure bearing sleeve being spaced from said metallic sheath,
5. a hard metal solder filling the space between and adhered to said pressure bearing sleeve and said sheath,
6. a cone-like surface welded to the outer end of said pressure bearing sleeve for engaging the shoulder of the bore, and
7. a screw threaded flange nut on the outer end of said thermocouple for tightening said cone-like surface against the shoulder of the bore.

* * * * *

UNITED STATES PATENT OFFICE
CERTIFICATE OF CORRECTION

Patent No. 3,996,071   Dated December 7, 1976

Inventor(s) Bernhard Klicks, et al.

It is certified that error appears in the above-identified patent and that said Letters Patent are hereby corrected as shown below:

[73] Assignee: Friedrich Uhde GmbH,

Dortmund, Germany

Signed and Sealed this

Sixth Day of September 1977

[SEAL]

Attest:

RUTH C. MASON
Attesting Officer

LUTRELLE F. PARKER
Acting Commissioner of Patents and Trademarks